(12) United States Patent
Caputo, II et al.

(10) Patent No.: US 9,197,709 B2
(45) Date of Patent: Nov. 24, 2015

(54) PROVISIONING DEDICATED NETWORK RESOURCES WITH API SERVICES

(71) Applicant: Level 3 Communications, LLC, Broomfield, CO (US)

(72) Inventors: Pete Joseph Caputo, II, Highlands Ranch, CO (US); Austin David Ritchie, Denver, CO (US); Alan Wade Prehmus, Littleton, CO (US); Travis Duane Ewert, Highlands Ranch, CO (US); Harold Wayne Teets, Highlands Ranch, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

(21) Appl. No.: 14/039,363

(22) Filed: Sep. 27, 2013

(65) Prior Publication Data
US 2015/0095497 A1 Apr. 2, 2015

(51) Int. Cl.
*H04L 29/08* (2006.01)
*H04W 4/00* (2009.01)

(52) U.S. Cl.
CPC .............. *H04L 67/16* (2013.01); *H04L 67/10* (2013.01); *H04W 4/001* (2013.01); *H04W 4/003* (2013.01)

(58) Field of Classification Search
USPC .......................................... 709/226, 201, 238
See application file for complete search history.

(56) References Cited

U.S. PATENT DOCUMENTS

| 5,101,402 | A | 3/1992 | Chiu et al. |
| 6,412,000 | B1 | 6/2002 | Riddle et al. |
| 6,526,044 | B1 | 2/2003 | Cookmeyer, II et al. |
| 6,873,600 | B1 | 3/2005 | Duffield et al. |
| 7,403,988 | B1 | 7/2008 | Blouin et al. |
| 7,706,291 | B2 | 4/2010 | Luft et al. |
| 7,773,536 | B2 | 8/2010 | Lloyd et al. |
| 7,788,354 | B2 | 8/2010 | Nag |
| 7,940,676 | B2 | 5/2011 | Griffin et al. |
| 7,970,930 | B2 | 6/2011 | Dobbins et al. |
| 8,612,599 | B2 * | 12/2013 | Tung et al. ................... 709/226 |
| 2011/0196971 | A1 | 8/2011 | Reguraman et al. |
| 2012/0134497 | A1 | 5/2012 | Roitshtein et al. |
| 2012/0151057 | A1 * | 6/2012 | Paredes et al. ................ 709/225 |
| 2012/0185913 | A1 | 7/2012 | Martinez et al. |
| 2012/0239792 | A1 | 9/2012 | Banerjee et al. |
| 2012/0303814 | A1 * | 11/2012 | Ferris ............................ 709/226 |
| 2013/0054830 | A1 * | 2/2013 | Nguyen et al. ................ 709/238 |
| 2013/0067345 | A1 | 3/2013 | Das et al. |
| 2013/0111260 | A1 * | 5/2013 | Reddy et al. ................ 714/4.11 |
| 2013/0111349 | A1 * | 5/2013 | Yan et al. ..................... 715/738 |

(Continued)

OTHER PUBLICATIONS

International Search Report, dated Jan. 29, 2015, Int'l Appl. No. PCT/US14/053271, Int'l Filing Date Aug. 28, 2014; 5 pgs.

(Continued)

*Primary Examiner* — Abdullahi E Salad

(57) ABSTRACT

Embodiments are disclosed that provision a cloud-based service together with a dedicated network connection to provision a cloud-based service element. In response to the request both the cloud-based service element and a dedicated network connection are provisioned. Provisioning the cloud-based service element together with the dedicated network connection enables the cloud-based service element to utilize the dedicated network connection.

22 Claims, 5 Drawing Sheets

(56) References Cited

U.S. PATENT DOCUMENTS

2013/0182606 A1      7/2013  So et al.
2013/0232267 A1*    9/2013  Shatzkamer et al. ......... 709/226
2013/0297802 A1*   11/2013  Laribi et al. .................. 709/226
2013/0311778 A1*   11/2013  Cherukuri et al. ............ 713/171

OTHER PUBLICATIONS

Written Opinion of the International Searching Authority, dated Jan. 29, 2015, Int'l Appl. No. PCT/US14/053271, Int'l Filing Date Aug. 28, 2014; 6 pgs.

* cited by examiner

PROVISIONING DEDICATED NETWORK RESOURCES WITH API SERVICES

BACKGROUND

1. Field

This field is generally related to provisioning dedicated network services.

2. Related Art

Many applications, such as data storage, processing, and presentation applications, utilize a communication network in their operation. Some applications, sometimes referred to as cloud-based applications, run remotely and are only accessible via the communication network. These applications may, for example, be hosted from a data center. A data center is a facility used to house computer systems and associated components, such as servers, telecommunications, and storage systems.

Cloud-based applications may be beneficial in that they allow resources to be shared among users. A user may avoid the need to purchase the underlying hardware and software for an application, instead paying a usage fee, perhaps by the hour. Taking advantage of economies of scale, cloud-based applications may be available at a lower cost than buying a software license and any underlying, hardware outright.

Network users may interact with the cloud-based applications via application programming interfaces (APIs). An API provides a specified way of interacting with the application. An API may be implemented, for example, using Simple Object Access Protocol (SOAP) or Representational State Transfer (REST).

To connect to the cloud-based application, the Internet may be used. However, it is desirable for many users to have dedicated connections to the cloud-based application. A dedicated connection may provide more secure and reliable access to the cloud-based application. However, setting up the dedicated network connection may be cumbersome.

BRIEF SUMMARY

In an embodiment, a computer-implemented method provides a cloud-based service. The method includes receiving a request from a user to provision a cloud-based service, element. In response to the user request, the method provisions a cloud-based service element. The cloud-based service element provides an application service from a data center where the web service is accessible using an application program interface via a network. The method also provisions a dedicated network connection on the network connected to the data center. The dedicated network connection connects the data center to another location geographically disparate from the data center and reserves network resources on the network between the data center and the other location to be used by the cloud-based service element. Provisioning the cloud-based service element together with the dedicated network connection enables the cloud-based service element to utilize the dedicated network connection, System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As mentioned above, cloud-based applications are desirable because they enable users to share resources. But, to access the cloud-based applications, users may require connectivity. Provisioning the network connection separately from the cloud-based application may be cumbersome. Embodiments involve provisioning the network connection together with the cloud-based application. By bundling the network connectivity with the cloud-based services, embodiments may simplify usage of cloud-based services.

The Detailed Description that follows is divided into three sections. The first section describes, with respect to FIGS. 1-3, a system for providing dedicated connection among cloud servers or users. The second section describes, with respect to FIG. 4, modules of a system that enable providing dedicated connection among cloud servers and users. The third section describes, with respect to FIG. 5, a method for setting up a connection from a user to a cloud server.

Dedicated Connection to a Cloud Server

Figure 1:
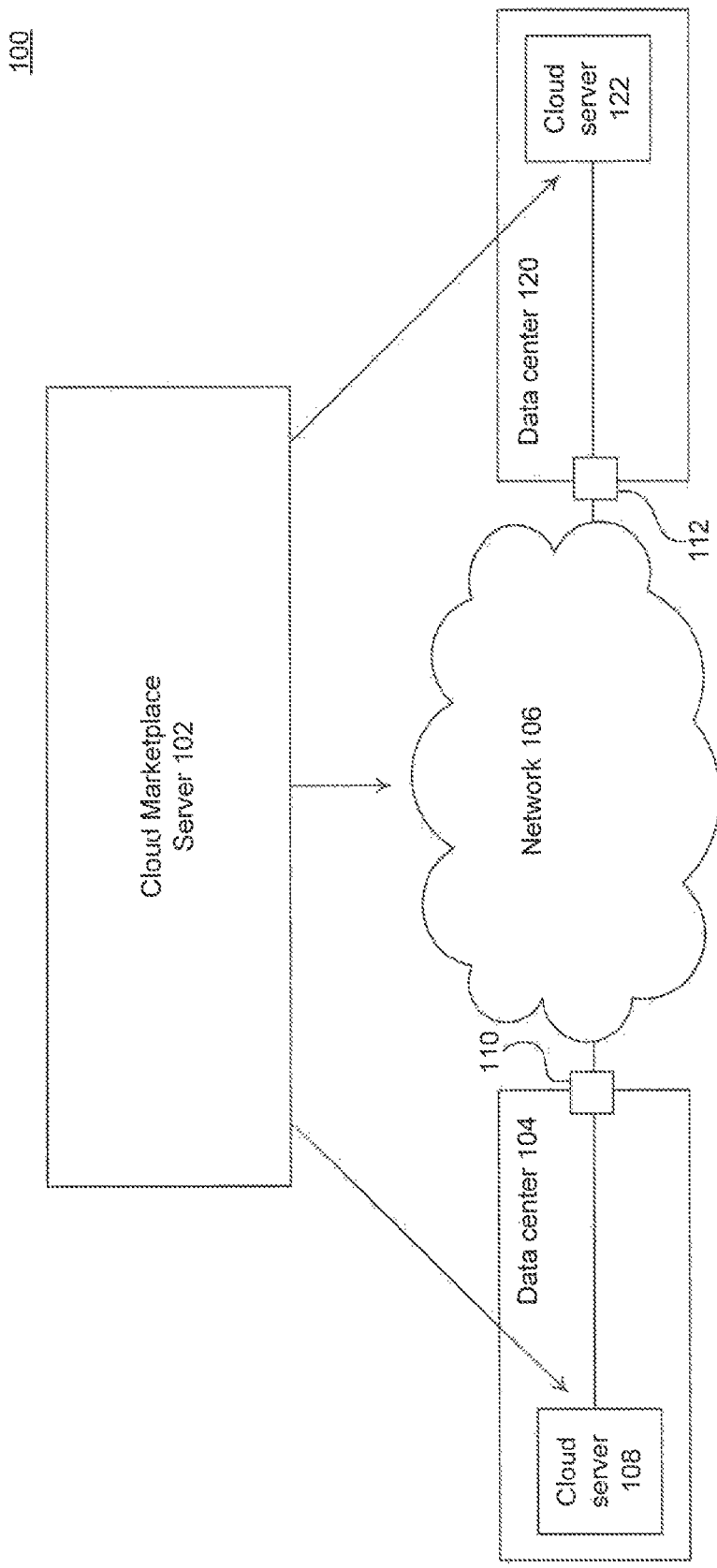
FIG. 1 is a diagram that illustrates a system for providing a dedicated connection between data centers.

FIG. 1 illustrates a system 100 that provides a dedicated connection using a communication network 106. Communication network 106 may be a metropolitan area network (MAN) or wide area network (WAN). It may utilize any point-to-point or multipoint-to-multipoint networking protocols. The network protocols used may include, for example, Ethernet, Transport Control Protocol (TCP), User Datagram Protocol (UDP), Internet Protocol (IP), Multiprotocol Label Switching (MPLS), Asynchronous Transfer Mode (ATM), High-Level Data Link Control (HDLC), Frame Relay, or Synchronous Optical Networking (SONET)/Synchronous Digital Hierarchy (SDH). Communication network 106 may, for example, be a network separate from the Internet.

Cloud marketplace server 102 provides users the ability to purchase the cloud services. It includes an interface for the users to select the applications they need. It further provisions network resources for connecting users to the servers that provide the cloud applications. Cloud marketplace server 102 is connected to the switching devices in network 106 and is capable of configuring the devices to provide the required connections.

The required connection may, for example, be a dedicated network connection. A dedicated network connection is a connection with bandwidth reserved for a particular user. A dedicated network connection may be set up using either a private or public network service technology. In other words, no other user of the network can have access to the bandwidth reserved for a particular user on a dedicated connection. Reserving bandwidth may involve associating a particular bandwidth with a user. While still reserving bandwidth, a network may be oversubscribed, meaning that if all users were using all their associated bandwidth the network would have insufficient capacity. Such a dedicated network connection may be point-to-point, in which the connection connects two points on the network. Also, the connection may be multipoint-to-multipoint, in which a set of one or more points on the network is connected to a second set of one or more network points. Additionally, the connection may be point-to-multipoint, in which a point on the network is connected to a set of one or more network points. A switching device may receive traffic for a particular network connection on a particular port.

In an example, network 106 may utilize an Ethernet protocol. In that example, the connection may be an Ethernet E-Line or E-LAN. E-Line and E-LAN are data services defined by the Metro Ethernet Forum that provide point-to-point and multipoint-to-multipoint Ethernet connections between a pair or plurality of user network interfaces.

Using a dedicated network connection on a network, such as a private or shared network, may provide more capacity, reliably, and security than merely connecting via the Internet.

Network 106 is connected to two data centers—data center 104 and data center 120. Data center 104 is connected to network 106 through a switching device 110, and data center 120 is connected to the network 106 through, a switching device 112. Data centers 120 and 104 are each facilities used to house computer systems and associated components, such as their own network infrastructures. They may include redundant or backup power supplies, redundant data communications connections, environmental controls (e.g., air conditioning and fire suppression), and security devices.

Data center 104 includes a cloud server 108. Cloud server 108 is a machine that runs a cloud application. It provides cloud-based services or applications to users. Cloud server 108 may provide such a service after receiving a request from a user to provision a cloud-based service element. A cloud-based service element can be an application such as a database or a web application. Cloud servers 108 and 122 are in data centers 104 and 120 respectively and can be geographically apart.

In an embodiment, a user can, using cloud marketplace server 102, purchase the dedicated network connection together with the cloud-based service element. In response to the purchase request, cloud marketplace server 102 communicates with cloud servers 108 and 122 to provision the cloud-based service and communicate with network 106 to provision the dedicated network connection. Provisioning the cloud-based service elements in cloud servers 108 and 122 together with the dedicated network connection among the cloud servers enables the cloud-based service elements to communicate over a dedicated connection.

In an example use case, a developer may use cloud-based service connections to build a web-based application. The web-based application may have two components: a web server and a database. Referring to FIG. 1, the web server may be on cloud server 108 and the database may be on cloud server 122. The developer may select the appropriate cloud-based services and a network connection between the two servers from cloud marketplace server 102. In response to the request, cloud marketplace server 102 may send messages to cloud servers 108 and 122 to set up cloud-based services and make them available to the developer. Also in response to the request, the cloud marketplace server 102 may send a message asking that network 106 set up a network connection between data centers 104 and 120, which host the respective cloud servers 108 and 122.

Network 106 may provide a connection between switching devices 110 and 112. Switching devices 110 and 112 reside at the edge of network 106 and may provide entry into data centers 104 and 120 or even be co-located in data centers 104 and 120. However, for data to reach cloud servers 108 and 122, additional routing may be required within data centers 104 and 120. Configuring connections within data centers 104 and 120 is illustrated, for example, with respect FIG. 2.

Figure 2:
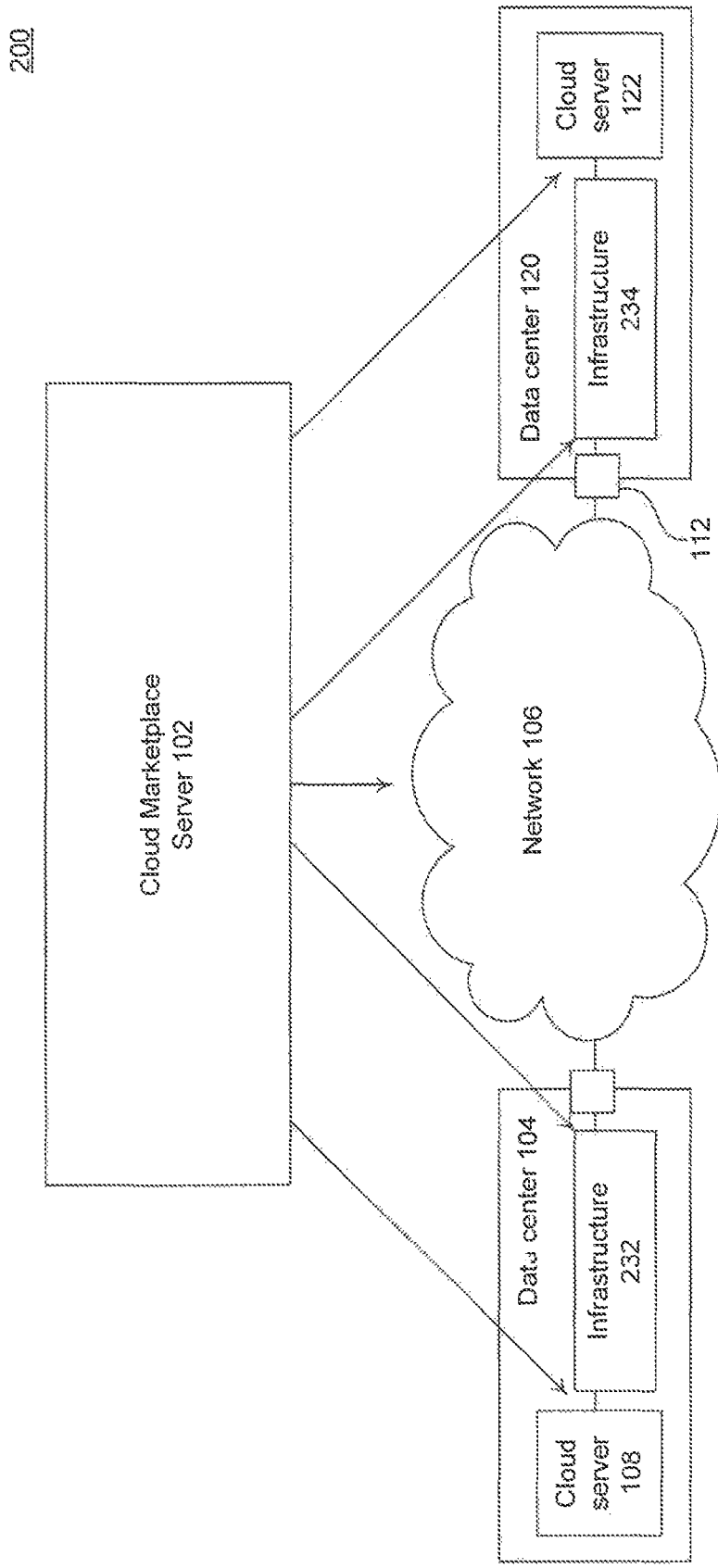
FIG. 2 is a diagram that illustrates a system for, providing a dedicated connection between network cloud servers through the data center's infrastructure.

FIG. 2 illustrates a system 200 for providing a connection between cloud server 108 and cloud server 122 through infrastructure networks within data centers 104 and 120. As illustrated in system 200, data center 104 has infrastructure network 232, and data center 120 has infrastructure network 234. Infrastructure networks 232 and 234 may be Local Area Networks (LANs) within the data center facilities.

In addition to provisioning connections in network 106, cloud marketplace server 102 may also be able to provision connections through infrastructure networks 232 and 234. This enables the cloud marketplace server 102 to set up a dedicated connection between cloud-based service elements on the cloud servers. Such a dedicated connection includes a dedicated net work connection over infrastructures 232 and 234 within data centers 104 and 120 respectively. In this way, cloud marketplace server 102 may also bundle cloud services with network connectivity services within the respective data centers.

The example in FIGS. 1 and 2 shows a network connection between two different data centers. However, the dedicated network connection may also be between a data center and enterprise as illustrated in FIG. 3.

Figure 3:
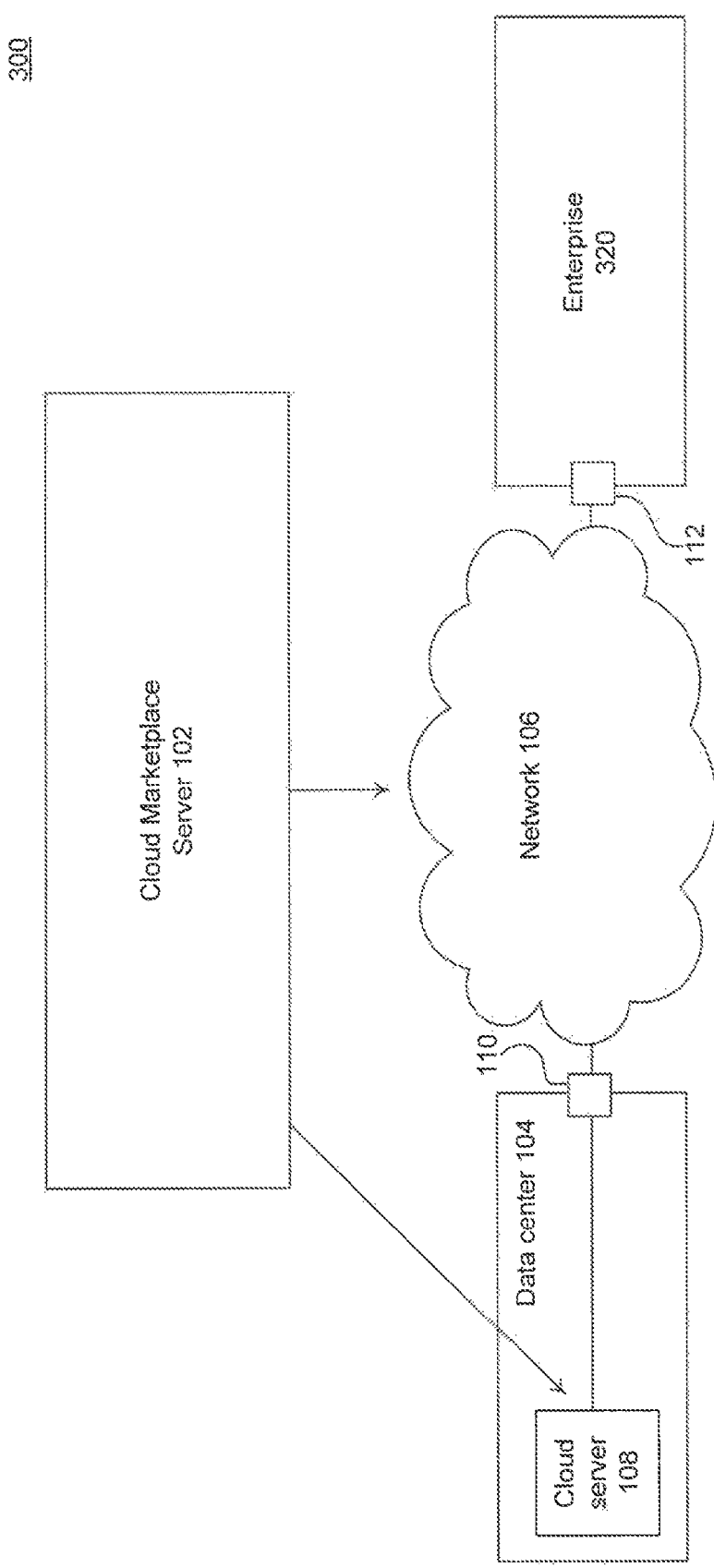
FIG. 3 is a diagram that illustrates a system for providing a dedicated connection between an enterprise and a cloud server.

FIG. 3 illustrates a system 300 for providing a connection between enterprise 320 and cloud server 108.

As above, in response to a user's request, cloud marketplace server 102 provisions both a cloud service and a dedicated network connection between switching devices 110 and 112. However, in system 300, switching device 12 resides on an enterprise 320. Enterprise 320 may include for example, an organization's internal network, or LAN. In this embodiment, a dedicated network connection is established between the enterprise and the cloud-based service element.

In one example use case, cloud server 108 may provide customer relationship management (CRM) services. Those software services may, for example, be used by persons within enterprise 320 to organize, automate, and synchronize sales, marketing, customer service, and technical support. When a user requests the customer relationship management services from cloud marketplace server 102, the user may also request a dedicated network connection to support those software services.

Figure 4:
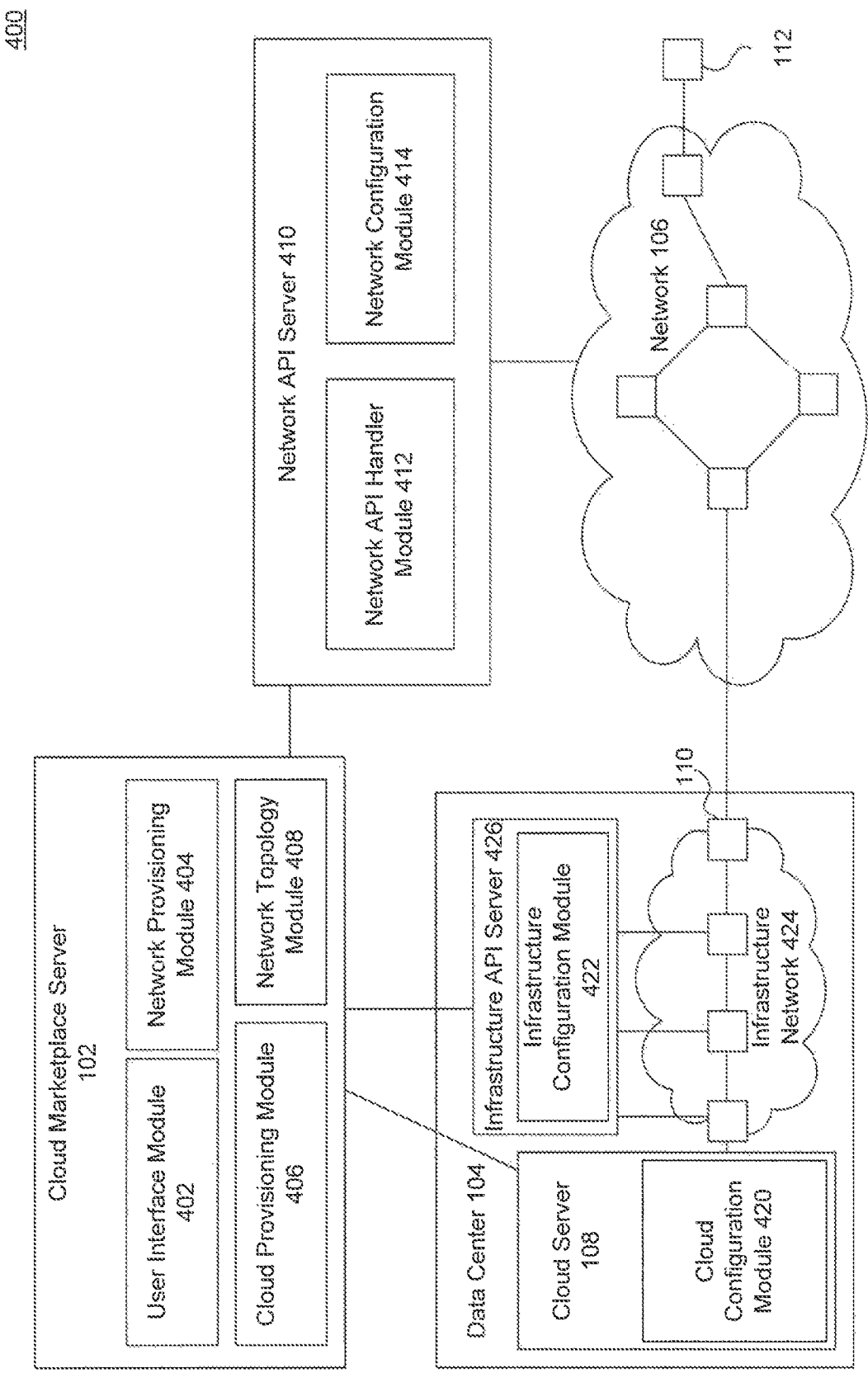
FIG. 4 is a diagram that illustrates network API server modules, cloud marketplace server modules and data center modules.

Providing the dedicated network services with the cloud services is described in greater detail with respect to FIG. 4. System FIG. 4 shows a system 400 for providing a dedicated connection to a cloud-based service element. Similar to the systems in FIGS. 1-3, system 400 includes cloud marketplace server 102, data center 104, network 106, and switching devices 110 and 112. These components are described in greater detail with respect to their sub-modules. Additionally, system 400 includes a network API server 410 that allows cloud marketplace server 102 to interface with network 106.

Cloud marketplace server 102 allows a user to request a cloud service. Cloud marketplace server 102 includes a user interface module 402, a network provisioning module 404, a cloud, provisioning module 406, and a network topology, module 408. The user may connect to cloud marketplace server 102 though user interface module 402. Using this interface, the user can select the cloud applications it requires. For example, user interface module 402 can receive a request from a user to provision a CRM service element or a relational database service element User interface module 402 may also allow a user to request a dedicated network connection.

The dedicated network connection may span over the network outside of a data center and the infrastructure network within the data center. The dedicated network connection connects the data center to another location that may be geographically disparate from the data center.

As described above, network 106 may utilize an Ethernet protocol and the network connection may be an Ethernet E-Line.

To provide options to a user, user interface module 402 act with network topology module 408. The cloud-based service element may be offered from a plurality of data centers in disparate locations. Network topology module 408 may select, based on a location of the user, a data center in proximity of the user's location. Based on the selected data center's location, network topology module 408 may determine the topology of the dedicated network connection.

To determine the topology of the dedicated network connection, network topology module 408 may make API calls to network API server 410. Network API server 410 may reply to the API calls using a network API handler module 412.

For example, network topology module 408 may ask network API server 410 whether network connections are available that connect to the data centers offering the cloud-based service element. Alternatively, network topology module 408 may periodically ask for the locations of all available data centers on the network and correlate those data centers with the data centers offering the cloud service element. In addition to determining the available endpoint locations, as an example network topology module 408 may query for the available bandwidth, latency, or jitter between two locations.

For example, a user's enterprise may be in Los Angeles, and the user may desire a cloud-based database service. The cloud-based service may be offered in data centers in Seattle, Las Vegas, and New York. To connect with the cloud-based service, network 106 may be able to provide a dedicated network connection between the user's enterprise in Los Angeles and the data center in Seattle or the data center in Las Vegas. User interface module 402 may present these various options to the user.

User interface module 402 may also present prices associated with the various options. To determine the price quote, user interface module 402 may send an API request to network API handler module 412. Network API handler module 412 determines a price quote for the usage of the resources by the user. The price quote is based on parameters such as a user's location and locations of selected data centers. The price quote may also vary depending on a service level, such as a bandwidth, latency, or jitter, or data quantity transferred, over the connections.

From various options, a user may, using user interface module 402, select not just the cloud-based service elements, but also a dedicated network connection that assists in their operation. Once the user has selected its desired options, it makes a selection to submit the order. The selection may, for example, be in the form of a single button on an HTML page that, when selected, causes the user's client to send an HTTP request to provision both the cloud and network services. In this way, by selecting a single user interface element, a user can request that both the cloud and network services be provisioned, In response to a user's request, network provisioning module 404 provisions the dedicated network connection. Network provisioning module 404 provisions the cloud-based service element together with the dedicated network connection. Such provisioning enables the cloud-based service element to utilize the dedicated network connection. To provision the cloud-based service element, network provisioning module 404 may send an API request to network API server 410.

In response to the API request, network API server 410 may use a network configuration module 414 to configure network 106 to provide the network connection. Network configuration module 414 may determine which switching devices on network 106 need to be configured to achieve the requested change. For example, network configuration module 414 may identify endpoint devices for each of the locations connected using the network connectivity services, such as switching devices 110 and 112 in FIG. 4.

Once network configuration module 414 identifies each of the interconnected switching devices, it configures the switching devices to provide the requested bandwidth to the user. For example, network configuration module 414 may send configuration commands to each of the switching devices. Configuring these different types of switches may require different commands. To deal with this problem, network configuration module 414 may first look up the necessary commands for each type of switch. In an example, network configuration module 414 may utilize different sub-modules that understand the mapping of generic attribute models to the specific configuration instruction set of the device being modified. Then, network configuration module 414 may send the appropriate type-specific commands to each of the switching devices. In this way, by interacting with network configuration module 414 using API calls, network provisioning module 404 configures the dedicated network connection across the network 106.

As mentioned above, the dedicated network connection across network 106 may connect various data centers or may connect a data center with an enterprise. In addition to configuring a dedicated network connection across network 106, network provisioning module 404 may also provision a network connection within data center 104.

To provision a network connection within data center 104, network provisioning module 404 may send an API request to an infrastructure API server 426. Infrastructure API server 426 has an infrastructure configuration module 422. Infrastructure configuration module 422 operates in a similar manner as network configuration module 414. Like network configuration module 414, infrastructure configuration module 422 looks up the switches that must be configured on the network, in this case infrastructure network 424, and sends the appropriate commands to the switches to configure the connection.

In an example embodiment, a data center may use Ethernet protocol on its infrastructure network. In such scenario, infrastructure configuration module 422 may, for example, use a tunneling algorithm through the Ethernet switching devices of data center 104 in order to provide a seamless dedicated connection from switching device 112 to cloud server 108.

In this way, network provisioning module 404, in response to the user's request, provisions an infrastructure network connection within the data center. The infrastructure network connection connects the cloud-based service element with the network.

Not only are infrastructure and wide area connections implemented in response to the user's request but the cloud service element may be also provisioned. Based on the user's request cloud provisioning module 406 instructs the cloud configuration module 420 to provide access to the requested application by the user.

Cloud configuration module 420, which may reside on the cloud server 108, is connected to the infrastructure network 424 and provides access to the requested application by the user. The dedicated connection that is set up on the infrastructure network 424 can communicate with cloud configuration module 420 to provide the user with access to the requested application.

To provide access to the requested application, cloud configuration module 420 may involve installing new software or configuring existing software to support additional users. For example, if the user requests a Linux server, cloud configuration module 420 may configure a virtual machine to run a Linux operating system. A skilled artisan would recognize that other cloud services may be provisioned in other ways.

In this way, in response to a single user request, embodiments automatically provision both a cloud-based service element and a dedicated network connection to provide secure access to the element.

In some embodiments the provisioning may involve immediately setting up and activating the cloud-based service element and the dedicated network connection. In other embodiments, the provisioning may also involve scheduling the cloud-based service element and the dedicated network connection to be activated at some point in the future. In one embodiment, the user can set, through an API call, times in the future to activate and deactivate the service. When the activate time occurs, cloud configuration module 420, infrastructure configuration module 422 and network configuration module 414 set up and activate the cloud based service elements, the infrastructure network connection on infrastructure network 424, and the network connection on network 106 respectively. Then, when deactivate time occurs, the respective modules deactivate the respective services. The times may occur on repeating basis.

In another similar embodiment, the user can set, again through an API call, conditions that trigger activation or deactivation of the services. The conditions may be triggered based on usage characteristics of other connections or usage characteristics of cloud based services. For example, a rule may state that, when a relational database service reaches 80% of storage capacity, another database service element and associated network connection services will be allocated. In this way, embodiments allow both cloud-based and network service elements to be automatically allocated based on future needs.

Method

Figure 5:
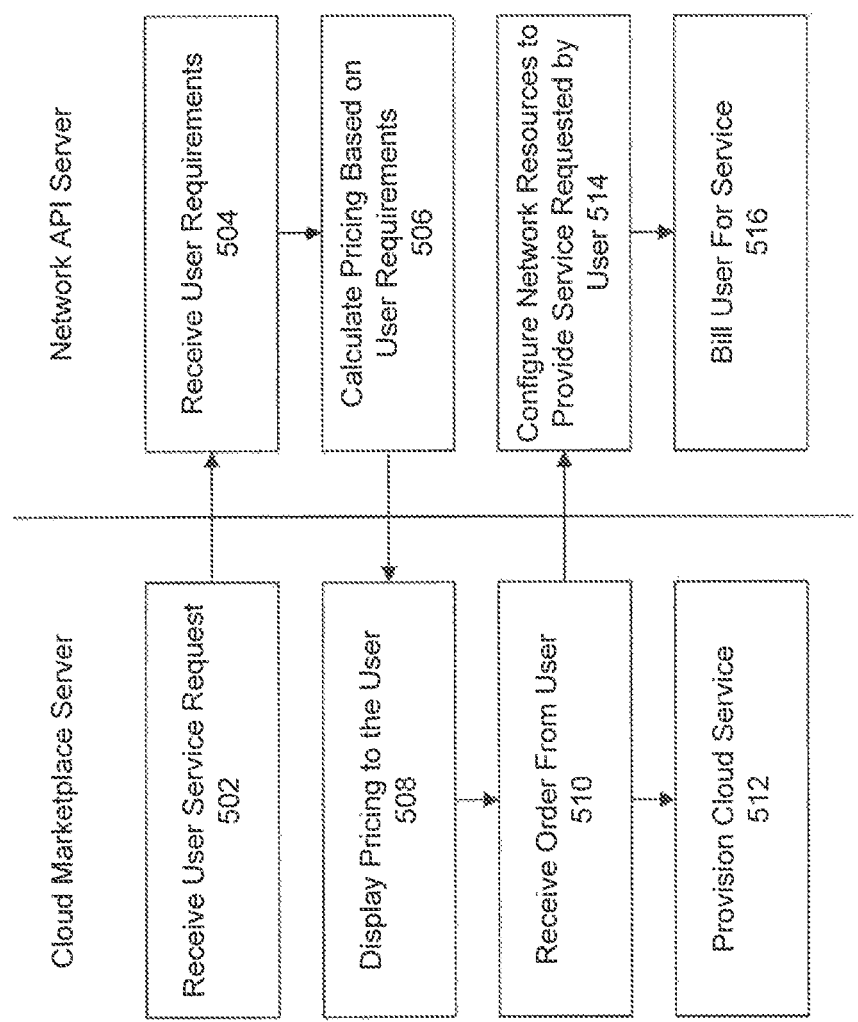
FIG. 5 is a flowchart that illustrates an example of provisioning a cloud service.

FIG. 5 is a flowchart that shows a method 500 for setting up dedicated connection to a cloud server based on a user's requirements. Method 500 shows an example of how a cloud marketplace server and a network API server, such as cloud marketplace server 102 and network API server 410, may interact.

Method 500 starts at step 502 when the cloud marketplace server receives a request from a user inquiring about a new cloud-based service. For example, step 502 may involve entering into a marketplace application. The marketplace application may be a web application accessible using a web browser. The marketplace application may have a shopping cart functionality that allows a user to select what cloud-based service elements it wants. When the user enters the marketplace and requests a cloud-based application, it shops for both cloud-based service elements and network connectivity services.

For example, a user may place three cloud-based virtual machines with certain CPU and memory requirements in its shopping cart. A user may also indicate that desires a dedicated network connection between the three virtual machines. These user requirements are sent in an API request to the network API server.

At step 504, the network API serve receives the user requirements. At step 506, the network API server uses the user requirements to calculate pricing for providing the requested service to the user. This calculation includes the costs of configuring the connections to provide access to the cloud server and providing the cloud-based service element.

At step 508, the cloud marketplace server displays a price quote to the user. If the user accepts and follows through with ordering the service, the cloud marketplace server receives the user order at step 510. In response to this acceptance, the cloud marketplace server provisions the cloud-based service element at step 512. The cloud marketplace server also sends a request to the network API server to configure network resources to provide the service requested by the user. This may include configuring switching devices in the network to provide a dedicated connection to the user.

Finally, at step 516, the network API server bills the use for the network requested network connection or the cloud service elements. The bill may be consistent with the pricing calculated at step 506. The price may also reflect, or be metered by, the duration, quantity, or usage that the user uses the network services. Any of these metering techniques may be used to determine a price for any of the configurations illustrated in FIGS. 1-3.

CONCLUSION

The term "user," as used herein, may encompass both a customer of the network connectivity service, such as an employee of a business that utilizes the network connectivity service, and a network administrator of the service provider itself. Users may also be at different companies or organizations. Users may also be automated programs and software applications.

Each of the servers and modules in FIG. 4 may be implemented in hardware, software, firmware, or any combination thereof.

Each of the servers and modules in FIG. 4 may be implemented on the same or different computing devices. Such computing devices can include, but are not limited to, a personal computer, a mobile device such as a mobile phone, a workstation an embedded system, a game console, a television, a set-top box, or any other computing device. Further, a computing device can include, but is not limited to, a device having a processor and memory, including a non-transitory memory, for executing and storing instructions. The memory may tangibly embody the data and program instructions. Software may, include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered computing environment or server farm.

Identifiers, such as "(a)," "(b)," "(i)," (ii), etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for provisioning a cloud-based service, comprising:
   (a) receiving a user request to provision a cloud-based service element, wherein the user request includes a condition;
   (b) determining a quote based, at least in part, on a location of the cloud-based service element;
   in response to the user request:
   (c) provisioning the cloud-based service element, the cloud-based service element providing an application service from a data center, the application service accessible using an application program interface via a network, wherein the provisioning (c) includes scheduling the cloud-based service element according to when the condition occurs;
   (d) selecting, based on a location of the user, the data center to provide the cloud-based service element from a plurality of data centers in disparate locations such that the selected data center is in proximity of the location of the user;
   (e) determining a topology of the dedicated network connection based on the location of the selected data center; and
   (f) provisioning a dedicated network connection on the network connected to the data center, the dedicated network connection connecting the data center to another location geographically disparate from the data center and reserving network resources on the network between the data center to the other location to be used by the cloud-based service element wherein the provisioning (f) includes scheduling the dedicated network connection according to when the condition occurs and configuring switching devices on the network, the switching devices selected based on the topology,
   whereby provisioning the cloud-based service element in (c) together with the dedicated network connection in (f) enables the cloud-based service element to utilize the dedicated network connection.

2. The computer-implemented method of claim 1, further comprising:
   (g) in response to the user request, provisioning an infrastructure network connection within the data center, the infrastructure network connection connecting the cloud-based service element with the network.

3. The computer-implemented method of claim 1, wherein the determining the quote (b) comprises
   determining the quote based on the location of the selected data center and the other geographically disparate location.

4. The computer-implemented method of claim 1, wherein the determining the quote (b) comprises:
   determining the quote based on an amount of data transferred over the dedicated network connection.

5. The computer-implemented method of claim 1, wherein the determining the quote (b) comprises
   determining the quote based on an amount of bandwidth available over the dedicated network connection.

6. The computer-implemented method of claim 1, wherein the other location is a location of another data center with another cloud-based service element.

7. The computer-implemented method of claim 1, wherein the other location is a location of a user's enterprise.

8. The computer-implemented method of claim 1, wherein the dedicated network connection has a particular bandwidth reserved on the network.

9. The computer-implemented method of claim 1, wherein the dedicated network connection is an Ethernet E-Line.

10. The computer-implemented method of claim 1, wherein the dedicated network connection is an Internet Protocol Virtual Private Network connection.

11. The computer-implemented method of claim 1, wherein the dedicated network connection is an Internet Protocol connection.

12. The computer-implemented method of claim 1, wherein the user request includes an activation time, the provisioning (c) includes scheduling the cloud-based service element to be activated at the activation time, and the provisioning (f) includes scheduling the dedicated network connection to be activated at the activation time.

13. The computer-implemented method of claim 1, the provisioning (c) includes scheduling the cloud-based service element to be activated when the condition occurs, and the provisioning (f) includes scheduling the dedicated network connection to be activated when the condition occurs.

14. A system for provisioning a cloud-based service, comprising:
   a computing device;
   a user interface module, implemented on the computing device, that receives a user request to provision a cloud-based service element, wherein the user request includes a condition;
   a network API handler module, implemented on the computing device, that determines a quote based, at least in part, on a location of the cloud-based service element;
   a cloud provisioning module, implemented on the computing device, that in response to the user request, provisions the cloud-based service element, the cloud-based service element providing a web service from a data center, the web service accessible using an application program interface via a network, wherein the cloud provisioning module provisions the cloud-based service element by scheduling the cloud-based service element according to when the condition occurs; and
   a network provisioning module, implemented on the computing device, that also in response to the user request, provisions a dedicated network connection on the network connected to the data center, the dedicated network connection connecting the data center to another location geographically disparate from the data center and reserving network resources on the network between the data center to the other location to be used by the cloud-based service element, wherein the network provisioning module provisions the dedicated network connection by scheduling the dedicated network connection according to when the condition occurs, whereby the cloud provisioning module, implemented on the computing device, provisions the cloud-based service element together with the dedicated network connection to enable the cloud-based service element to utilize the dedicated network connection;

a network topology module, implemented on the computing device, that selects, based on a location of the user, the data center to provide the cloud-based service element from a plurality of data centers in disparate locations such that the selected data center is in proximity of the location of the user and determines a topology of the dedicated network connection based on the location of the selected data center, and wherein the network provisioning module, implemented on the processing unit, sends a message to a network API server to configure switching devices on the network, the switching devices selected based on the topology.

15. The system of claim 14, wherein the network provisioning module, in response to the user request, provisions an infrastructure network connection within the data center, the infrastructure network connection connecting the cloud-based service element with the network.

16. The system of claim 14, wherein the network API handler module that determines the quote based on the location of the geographically disparate other location.

17. The system of claim 14, wherein the other location is a location of another data center with another cloud-based service element.

18. The system of claim 14, wherein the other location is a location of a user's enterprise.

19. The system of claim 14, wherein the dedicated network connection has a particular bandwidth reserved on the network.

20. The system of claim 19, wherein the dedicated network connection is an Ethernet E-Line.

21. A program storage device tangibly embodying a program of instructions executable by at least one machine to perform a method for provisioning a cloud-based service, the network including a plurality of interconnected switching devices, the method comprising:

(a) receiving a user request to provision a cloud-based service element, wherein the user request includes a condition;

(b) determining a quote based, at least in part, on a location of the cloud-based service element;

in response to the user request:

(c) provisioning the cloud-based service element, the cloud-based service element providing an application service from a data center, the application service accessible using an application program interface via a network, wherein the provisioning (c) includes scheduling the cloud-based service element according to when the condition occurs;

(d) selecting, based on a location of the user, the data center to provide the cloud-based service element from a plurality of data centers in disparate locations such that the selected data center is in proximity of the location of the user;

(e) determining a topology of the dedicated network connection based on the location of the selected data center; and (f) provisioning a dedicated network connection on the network connected to the data center, the dedicated network connection connecting the data center to another location geographically disparate from the data center and reserving network resources on the network between the data center to the other location to be used by the cloud-based service element wherein the provisioning (f) includes scheduling the dedicated network connection according to when the condition occurs and configuring switching devices on the network, the switching devices selected based on the topology, whereby provisioning the cloud-based service element in (c) together with the dedicated network connection in (f) enables the cloud-based service element to utilize the dedicated network connection.

22. The program storage device of claim 21, the method further comprising:

(g) in response to the user request, provisioning an infrastructure network connection within the data center, the infrastructure network connection connecting the cloud-based service element with the network.

* * * * *